April 11, 1967  H. J. STOCK  3,313,129
ARRANGEMENT FOR SYNCHRONIZING PROGRAM CONTROLLED
MACHINE OPERATIONS WITH MACHINE MOVEMENTS
Filed Jan. 17, 1966  5 Sheets-Sheet 1
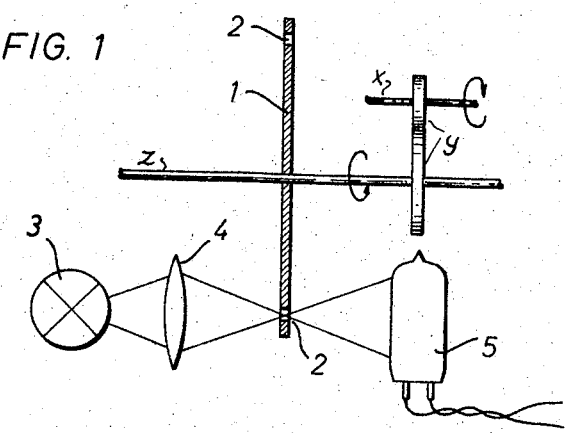
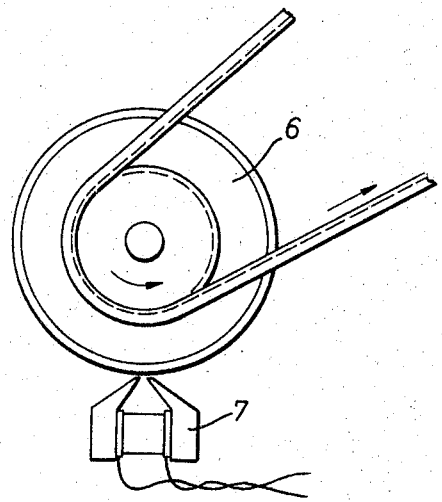
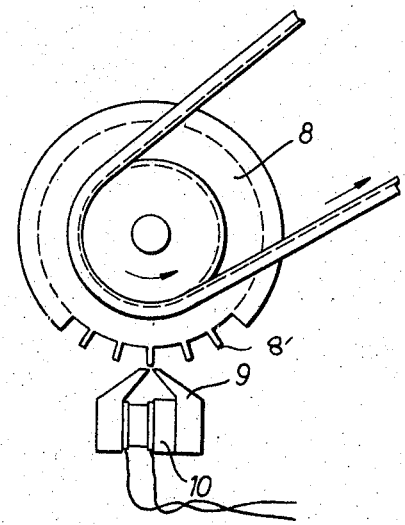
Inventor
Hans Joachim Stock
by
Michael S. Striker
Atty April 11, 1967 H. J. STOCK 3,313,129
ARRANGEMENT FOR SYNCHRONIZING PROGRAM CONTROLLED
MACHINE OPERATIONS WITH MACHINE MOVEMENTS
Filed Jan. 17, 1966 5 Sheets-Sheet 3

Inventor
Hans Joachim Stock
by
Michael J. Striker

Inventor
Hans Joachim Stock
by
Michael J. Striker

United States Patent Office 3,313,129
Patented Apr. 11, 1967

3,313,129
ARRANGEMENT FOR SYNCHRONIZING PROGRAM CONTROLLED MACHINE OPERATIONS WITH MACHINE MOVEMENTS
Hans Joachim Stock, Freiburg, Germany, assignor to Franz Morat G.m.b.H., Stuttgart-Vaihingen, Germany
Filed Jan. 17, 1966, Ser. No. 520,938
Claims priority, application Germany, Mar. 6, 1965, M 64,421
14 Claims. (Cl. 66—154)

The present application is a continuation-in-part application of my copending application Ser. No. 17,888, filed Mar. 28, 1960, and now abandoned.

The present invention relates to an arrangement for synchronizing program controlled operations of a machine with other machine movements. More particularly, the invention deals with the problem of timing control impulses which energize electric actuating means of an operating means controlling certain machine operations.

It is necessary that a program controlled operation is carried out at the precise moment in which another part of the machine is in a certain position, and in accordance with the invention, control impulses produced by program control means, such as a program tape, are extended, and only used for a short time period determined by other synchronizing impulses produced by a moving machine part.

For example, if the invention is applied to a circular knitting machine, an electromagnetic operating means is provided either in a pattern wheel for controlling the jacks of the same, or directly cooperates with the needle cylinder or the dial for causing movement of the respective needles.

The energization of the electromagnetic operating means must take place in rigid synchronism with the movement of the pattern wheel or of the needle cylinder, but in accordance with a program recorded in the form of slots or other light permeable portions of a program tape. The movement of the program tape is not exactly synchronized with the movement of the needle cylinder or pattern wheel, and in accordance with the invention, short control impulses of a predetermined duration at spaced predetermined timed intervals are produced by the needle cylinder, pattern wheel, or other movable means moving in rigid synchronism with the same, and the electromagnetic operating means is only energized while the two impulses coincide. A knitting machine according to the prior art is known in which a stationary needle cylinder has needles respectively associated with a series of electromagnetic means energized by corresponding series of switches under the control of an intermittently rotating pattern drum. Second switches are successively actuated by a rotating member for successively connecting the first mentioned switches to the series of electromagnetic control means so that the same are energized only where first mentioned switches are closed in accordance with the desired pattern. Since the needle cylinder is stationary, no synchronization between the rotary movement of the needle cylinder and the energization of the electromagnetic means is necessary. However, in the arrangement of the present invention, there is no synchronization maintained between the program tape and the needle cylinder, dial, or pattern wheel, so that it is necessary to control the actuation of the electromagnetic operating means in accordance with impulses received from both the program tape and the movable means of the machine, such as the needle cylinder, dial, or pattern wheel.

In accordance with the invention, for example, individual needle-influencing jacks are moved between inoperative and operative positions under control of electromagnetic means which are energized at the exact moment in which the particular jack is in the proper position for influencing an associated needle, while the electromagnetic means is only energized if the program control means determines in accordance with the desired knitting pattern that the respective needle is to be actuated.

It is the main object of the invention to provide an arrangement in which an operating means which controls machine operations, is actuated in rigid synchronism with a movable means of a machine, and also in accordance with a program.

Another object of the invention is to provide an arrangement in which an operating means controlling machine operations is operated in exact synchronism with a movable means of the machine, for example with the needle cylinder or the pattern wheel of a circular knitting machine, irrespective of the fact that exact and rigid synchronization between the program control means and the movable means of the machine cannot be maintained.

It is also an object of the invention to provide an arrangement for obtaining an exact timing of the energization of an electrical device in accordance with pattern control means.

With these objects in view, the present inveniton relates to an arrangement for synchronizing program control operations with machine movements, for example for synchronizing the actuations of an operating means controlling machine operations with the movements of continuously movable means forming part of the respective machine.

One embodiment of the invention comprises first continuously movable, preferably rotary means; control means moving in rigid synchronism with the first means; first switching means controlled by the control means to cyclically assume an operative condition for predetermined first time periods at exactly spaced time intervals; second continuously movable preferably rotary means; program control means continuously driven by the second means in such a manner that rigid synchronism with the first means cannot be maintained; second switching means having inoperative and operative conditions, and being controlled by said program controlled means in accordance with the program to assume the operative condition for second time periods longer than said first time periods and timed so that during relative movement between the first means and the program control means, the first time periods fall within the second time periods; and at least one operating means for controlling machine operations and having electric actuating means connected into the circuit of the first and second switching means.

The electric actuating means are energized to actuate the operating means only when both the first and second switching means are in operative conditions. As a result, the machine operations are controlled by the operating means in accordance with a program determined by the program control means, and in exact synchronism with the first movable means.

In one embodiment of the invention, the first movable means includes a rotary pattern wheel carrying electromagnetic operating means for shifting the jacks of the pattern wheel in accordance with a pattern determined by the program control means.

In another embodiment of the invention, the first movable means include the continuously rotating needle cylinder of a circular knitting machine, and electromagnetic operating means influence the needles of the needle cylinder to move to knitting positions in accordance with the pattern represented by the program control means.

The first switching means may be constructed in different ways, and may, for example, include a switch contact operated by a cam wheel forming part of the first movable means. The first switching means may also include impulse generators controlled by the control means of the first movable means to produce exactly timed impulses supplied to a gate to which the program controlled second switching means supply other impulses, the gate being connected with the electric actuating means of the operating means to energize the same when the two impulses coincide.

The novel features which are considered as characteristic for the invention are set forth in part in the appended claims. The invention itself, however, both as to its construction and its method of operation together with additional objects and advantages thereof, will be best understood from the following description of specific embodiments when read in connection with the accompanying drawings, in which:

FIG. 1 is a diagrammatic illustration of a photoelectric device for producing a control impulse;

FIG. 2 is an illustration of a second device for the same purpose, including a magnetizable record carrier and an electromagnetic pick-up device;

FIG. 3 is an illustration of a third device for the same purpose, including a ferromagnetic yoke member cooperating with an electromagnetic pick-up device;

Figure 9:
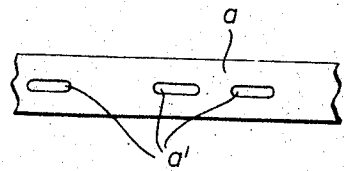
FIG. 9 illustrates in plan view a portion of a program carrying tape.
Figure 10:
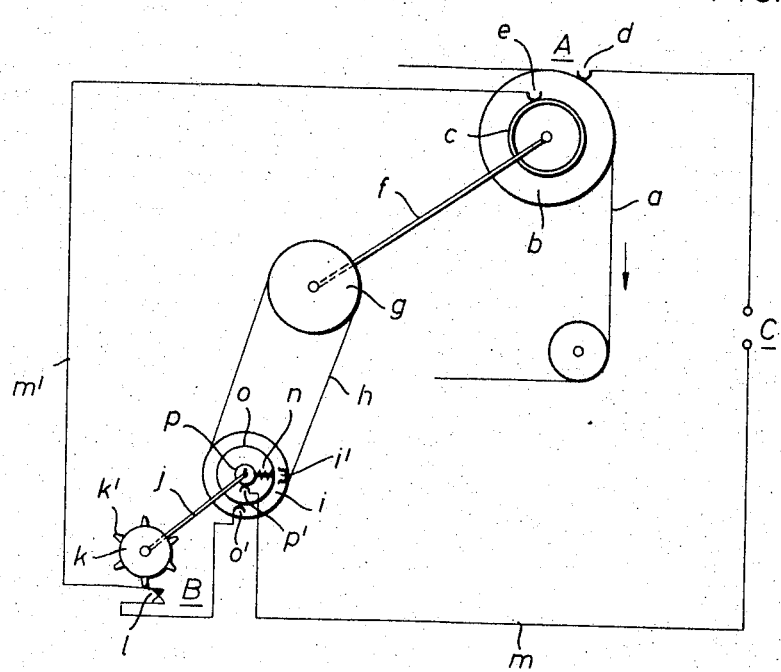
FIG. 10 is a diagrammatic illustration of one embodiment of a complete control arrangement according to the invention.
Figure 11:
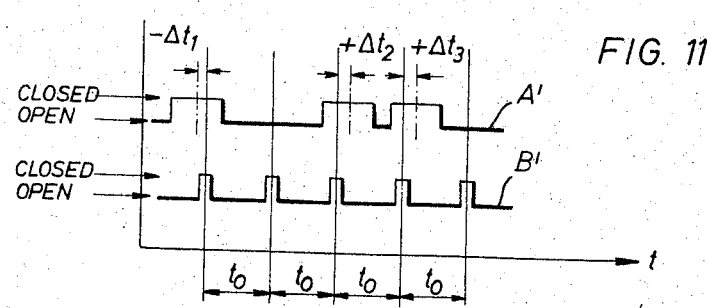
FIG. 11 is a time diagram illustrating the time relations between the various circuit-closing operations or impulses occurring in the operation of the arrangement according to the invention.

The invention will be best understood by referring first to FIGS. 9, 10 and 11.

It may be assumed that in a machine a shaft $f$ is driven continuously at a predetermined rotary speed by device means not shown. One end of the shaft $f$ carries a transporting roller $b$ which is, the above used terminology, a movable machine means. A program tape $a$ as illustrated by way of example in FIG. 9 and having a sequence of comparatively elongated perforations $a'$ or corresponding program elements spaced from each other according to the predetermined program, is guided over the periphery of roller $b$ in a conventional manner. A sliding contact $d$ is connected with one terminal of the source of electric energy C and bears down on the moving tape $a$ so as to make contact with the conductive surface of the roller $b$ whenever the contact $d$ is met by one of the perforations $a'$. The roller $b$ carries also a conductive ring $c$ which is in conductive connection with the conductive periphery of the roller $b$. A second sliding contact $e$ slides on the ring $c$.

On the opposite end of the shaft $f$ is mounted a pulley $g$ which drives through a belt or chain $h$ a rotary member $i$. The rotatable member $i$ carries an electrical control device illustrated by a solenoid winding $n$ which is capable of operating or moving, when energized, a control means $i'$ movable radially relative to the member $i$ to position X.

Figure 13:
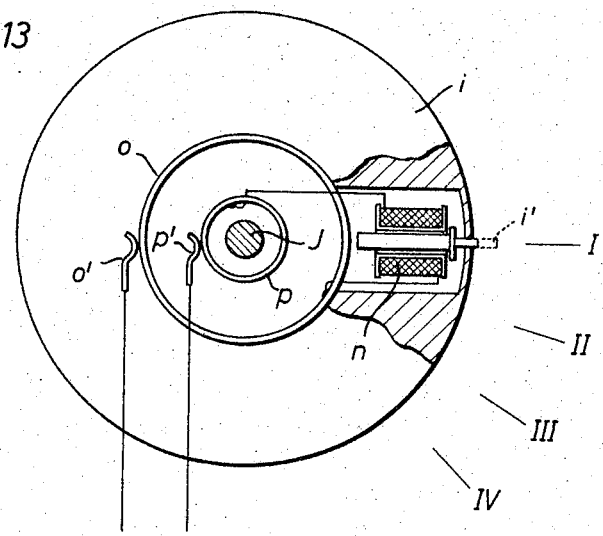
FIG. 13 is a diagrammatic illustration showing details of FIGS. 11 and 12 at a larger scale.

FIG. 13 illustrates this arrangement at a larger scale. Element $i'$ may be, in a circular knitting machine, a needle-influencing member which has to be moved, during the rotation of its carrier member $i$, in radial direction, but only in selected angular positions thereof so that the radial movement of the element $i'$ would e.g. actuate a selected knitting needle. Rotary member $i$ may also be a pattern wheel, as disclosed in the U.S. Patent 3,079,775 having an electromagnetic means $n$, $i'$ for operating needle controlling jacks between inoperative and operative positions.

The winding $n$ is connected at its ends with conductive rings $o$ and $p$, respectively, which are permanently in conductive contact with respective slide contacts $o'$ and $p'$, respectively. The rotary member $i$ is carried by a shaft $j$ which carries at its opposite end a control wheel $k$ having a plurality of radially projecting cam members $k'$ similar to the device illustrated by FIG. 7 at a larger scale. Members $i$, $j$, and $k$ are a first movable means connected by transmission $h$, $g$, $f$ to the second movable means $b$ which include a transporting roller for program tape $a$. Adjacent to the control wheel $k$ is a stationary circuit-closing switching device comprising a stationary contact and a movable contact member $l$ which latter is controlled by the cam members $k'$ so as to be moved thereby from its normally open contact position into circuit-closing position whenever the cam wheel $k$ i.e., one of the cam members $k'$ is in a predetermined position with member $i$ or, more particularly the movable or operable element $i'$ thereof.

The first switching device $l$ is connected by a line $m'$ with the previously mentioned slide contact $e$ of the second switching device $e$, $d$, $c$, while the stationary contact of the first switching device is connected with the sliding contact $o'$. The sliding contact $p'$ is connected by a line $m$ with the second terminal of the source C.

By reference to the time diagram of FIG. 11 it can been seen that during the rotation of rotary means $i$, $k$ with control projections $k'$, a sequence of circuit-closing operations will be effected at the point B at predetermined time intervals $t_0$ illustrated by the diagram line B'. In this example all the time intervals are of equal magnitude, under the assumption that in this example the elements $i'$ of the member $i$ assume consecutive angular positions I–IV in which they are to be operated also at equal time intervals for first equal time periods. Should there be more than one operable element $i'$ on the member $i$ spaced from each other at equal or different angular intervals then, of course, the cam members $k'$ of the wheel $k$ will be spaced from each other accordingly so that the closing movement of the movable contact $l$ is effected by one of the cam members $k'$ every time when the associated element $i'$ is in operable position. Thus one part of the circuit C, $d$, $e$, $m'$, $l$, $o'$, $p$, $m$, C is closed at the point B with accurate timing for the operation of the respective elements $i'$. However, in order to cause operation of the individual elements $i'$ selectively in accordance with a program represented by the perforations $a'$ of the program tape $a$, the above mentioned circuit is completed selectively only when a perforation $a'$ reaches the sliding contact $d$. Thus the closing of the other part of the circuit at the point A corresponds to the selective program. This is illustrated in FIG. 11 by the diagram line A'. Since the connection of the first member $b$ with the second member $i$ through the above described drive connections and also with the program tape *a* is likely to produce certain inaccuracies in timing of the circuit closure at the point A, with respect to the timing of the circuit closure at the point B, the perforations *a'* of the program tape *a* are purposely provided with a certain length so that the duration of the circuit closures at the point A by the second switching means *c*, *d* is considerably longer than the duration of the circuit closures at the point B by the first switching means *e*. Evidently, the duration of the circuit closure at the point A should not be larger than the time intervals $t_0$ between the circuit closures at the point B. The circuit closures at the point A in accordance with the program represented by the perforations of the program tape *a* are illustrated by the diagram line A' in FIG. 11. From this it can be seen that positive and negative time differentials $-\Delta t_1$, $+\Delta t_2$ or $+\Delta t_3$ will not affect the desired program selection of selected ones of the circuit closures affected at the point B. Evidently, the range of permissible deviations of timing at the point A is determined by 50% of the duration of the circuit closures at A.

Figure 12:
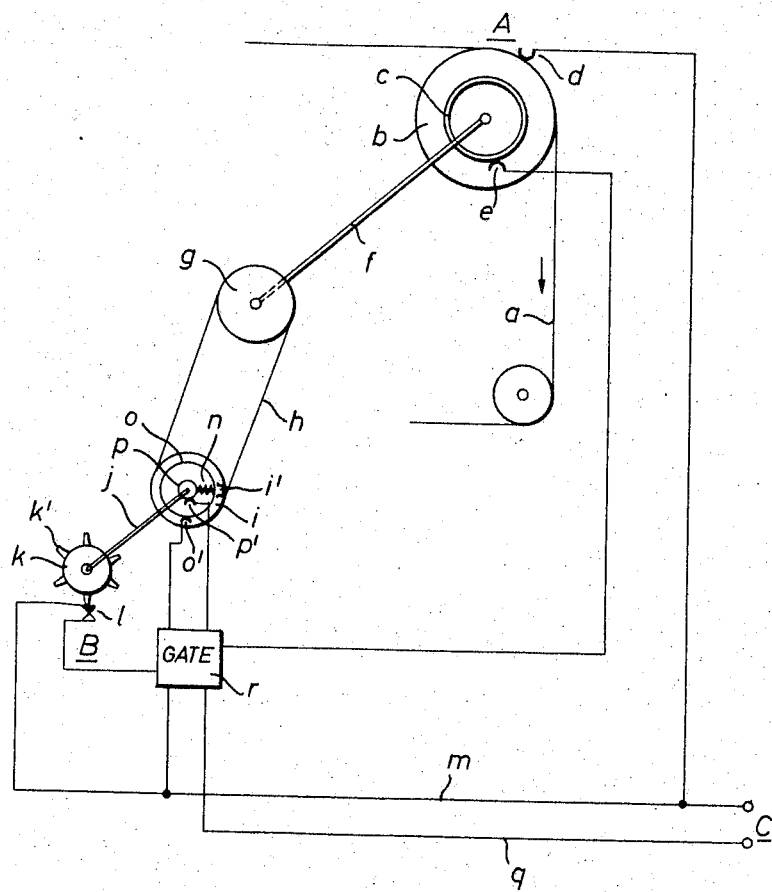
FIG. 12 is a diagrammatic illustration of a modification of the embodiment illustrated by FIGS. 9 and 10.

The embodiment illustrated by FIG. 12 is entirely analogous to that previously described except that the circuit is modified by replacing the series connection of contact *d*, *e* at A with contact member *l* at B at a more elaborate system. It can be seen, that the source of electrical energy C is connected by lines *m* and *q* with a device *r* which is label "GATE." The contact pairs *d*, *e* and *o'*, *p'* as well as the circuit closing device comprising the movable contact *l* are respectively in circuit with the device *r*. The control device *r* may be a relay set which closes the energy supply from C to the contacts *o'* and *p'* and thereby to the winding *n* provided that there is a simultaneous energization of the relay set both from the contact *d* and from the contact *l*. However, the control device *r* may also be of an electronic type, comprising conventional amplifier and gate means in order to respond to impulses of predetermined duration determined by the closing of the contact means at A and at B. Of course, if desired, amplifier means may be provided in the circuit portions connecting the contact devices at A and B with the gate *r*. The operation of the embodiment according to FIG. 12 is also illustrated by FIG. 11.

Although the connection between the rotary member *i* with the control wheel *k* is shown, by way of example, as a shaft *j* any other equivalent connection may be used provided that this connection safely prevents any phase difference between the rotation of the member *i* and the member *k* with its control means *k'* whereby switching means *e* are closed in rigid synchronism with rotary means *i*, *j*, *k*.

Similarly, the program control means shown at A do not have to be of the type illustrated and described using a perforated tape *a* and sliding contacts *d*, *e* in connection with a conductive rotary member *b*, they may be of any other suitable type capable of closing a circuit at predetermined time intervals of variable duration, for predetermined durations.

The circuit-closing means or impulse producing or generator means at B may be of various types, several of which are illustrated by FIGS. 1–8.

FIG. 1 illustrates a photoelectric impulse generator comprising a control disc 1 supported for rotation about the axis Z and provided with a series of perforations 2 arranged along a circle concentric with the axis Z. The disc 1 may be rotated by means of set of gears Y connecting the diagrammatically shown drive axis X with the diagrammatically shown driven axis Z. The axis X may be connected with the shaft *j* of the rotary member *i* of FIGS. 10 and 12. A source of light 3 is provided to project a beam of light through optical means 4 onto a photo-responsive cell 5, the beam of light being arranged to pass through any one of the perforations 2 whenever one of the latter passes through the beam of light. Consequently, the cell 5 will, depending on its connection in the circuit either act as a switching device similar to the contact *l* in FIG. 10 or as an impulse generating device in the arrangement according to FIG. 12. Of course, in the latter case amplifier means would have to be provided between the cell 5 and the gate *r*.

FIG. 2 illustrates a magnetic impulse generator. The control disc 6 driven in synchronism with the member *i* is a magnetizable record carrier made of magnetizable material or provided with a surface layer of magnetizable material on which spaced surface portions are premagnetized in conventional manner. A magnetic pick-up head 7 is mounted adjacent to the magnetizable surface of the disc 6 so as to pick up at predetermined time intervals the signal recorded by magnetization on the surface of the disc 6 and thereby to generate an impulse in the connected circuit.

FIG. 3 is a modification of the device according to FIG. 2. In this case the rotary control disc or drum 8 is not magnetized but consists at least in its peripheral portion of ferro-magnetic material. The magnetic pick-up head 9 is provided, next to the pick-up coil, with a permanent magnet 10 setting up a magnetic circuit in the head 9. Whenever one of the radially projecting teeth 8' of the disc 8 passes by the gap between the two legs of the head 9 the magnetic circuit is reinforced whereby in the coil an impulse is generated for being transmitted to the connected circuit.

Figure 4:
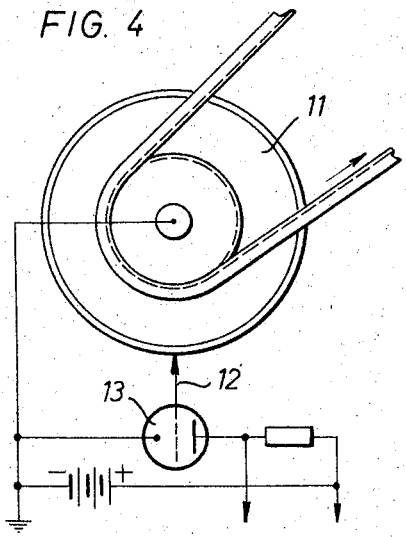
FIG. 4 is an illustration of a fourth device including a circuit diagram depicting means including an impulse storage disc cooperating with an electronic pick-up device.
Figure 5:
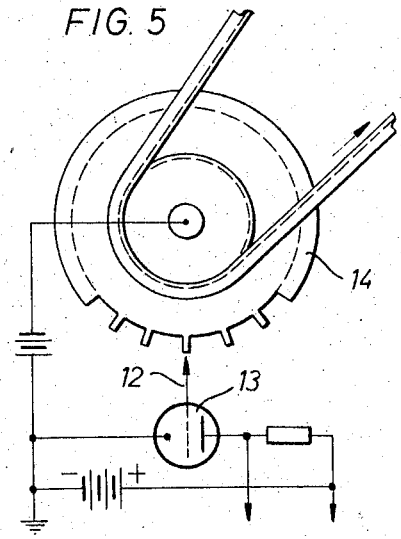
FIG. 5 illustrates a fifth device differing from FIG. 4 by the arrangement of radial projections on a storage disc.

FIGS. 4 and 5 illustrate electrical impulse generators. In the case of FIG. 4 a control drum 11 is provided with a layer of material which is capable of being permanently electrically polarized, or may be provided entirely out of such material, in either case control signals spaced from each other are applied to the periphery of the member 11 by polarization. The signals are picked up by a pick-up electrode 12 in conventional manner, said electrode being connected with the grid of an electrometer tube 13. FIG. 5 differs from FIG. 4 only by the disc or drum member 14 being provided with radially projecting teeth which are polarized in the same manner as the surface of the disc 11 in FIG. 4.

Figure 6:
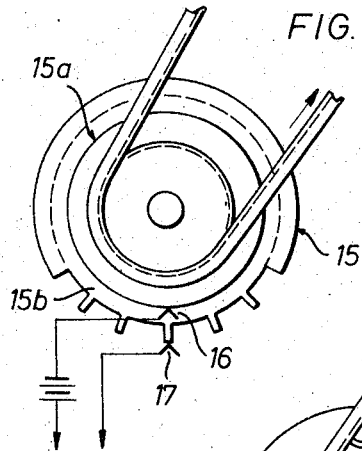
FIG. 6 illustrates a sixth device for the same purpose, including switch means operated by a rotating toothed wheel.
Figure 7:
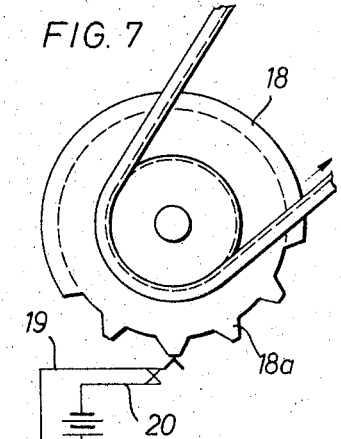
FIG. 7 illustrates a seventh device which is a modification of the device of FIG. 6, and providing a cam wheel.
Figure 8:
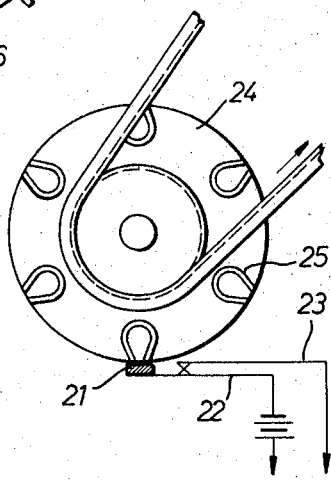
FIG. 8 illustrates an eighth device for the same purpose, including a wheel equipped with a plurality of permanent magnets cooperating with a magnetically operable switch.

FIGS. 6–8 illustrate examples of electromechanical circuit closing or impulse generating means. In FIG. 6 a generator control disc 15 comprises two separate disc members 15*a* and 15*b* which are insulated from their shaft. Member 15*b* is provided with spaced teeth designed to make contact with a stationary contact 17, while the other disc member 15*a* is continuously conductively connected with a sliding contact 16. Since the members 15*a* and 15*b* are interconnected conductively the circuit portion connected with the contacts 16 and 17 is closed whenever one of the teeth of the member 15*b* engages the contact 17. In FIG. 7 the rotary member 18 is a cam wheel provided with a series of cams 18*a* (*k'* in FIG. 10) designed to close the contact pair 19, 20 whenever one of the cams 18*a* engages the movable contact 19 (*l* in FIG. 10) whereby the connected circuit portion is closed.

FIG. 8 differs from FIG. 7 in showing the rotary control member 24 equipped with a plurality of permanent magnets 25 which during rotation cooperate with a ferro-magnetic or permanently magnetized armature member 21 mounted on the movable contact member 22 so that the member 22 is moved into closing position with respect to the stationary contact 23 whenever one of the magnets 25 passes adjacent to the armature member 21 whereby the corresponding circuit portion is closed.

In all the examples illustrated in FIGS. 2–8 it is to be assumed that the rotary control means shown therein are in operative connection with the rotary member *i* of FIGS. 10 and 12 so that the rotation of the just-mentioned rotary member is always rigidly synchronized with the rotation of the member *i*.

Figure 14:
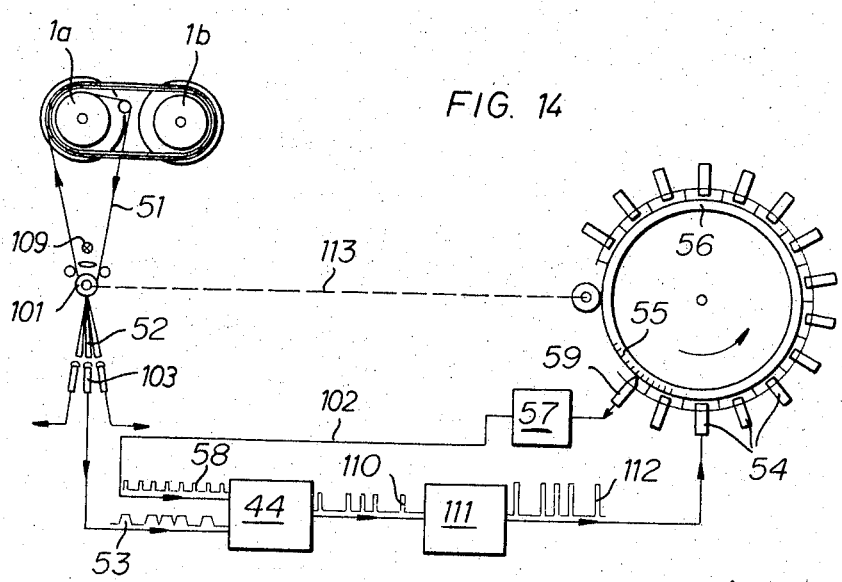
FIG. 14 is a diagrammatic illustration of an embodiment of the invention applied to a circular knitting machine.

Referring now to the embodiment of FIG. 14, a needle cylinder 56 of a circular knitting machine has axially extending grooves separated by axially extending projections 55 and receiving needles for axial movement, as known to those skilled in the art. At each knitting station, of which only some are illustrated in FIG. 14, an electromagnetic operating means 54 is provided which, when energized, causes movement of a directly opposite cylinder needle in axial direction to an operative knitting position. The arrangement may correspond to the construction disclosed in the copending application Ser. No. 443,519.

A transmission schematically indicated at 113 connects the rotary needle cylinder 56 with a second rotary means, namely a transporting roller 101 transporting a program tape 51 which has elongated perforations or light permeable portions corresponding to the slots a' shown in FIG. 9. Transporting roller 101 is driven in synchronism with needle cylinder 56 by the transmission 113. The program tape is wound in endless loops over reels 1a and 1b. A source of light 109 produces a bundle of rays passing through a condenser lens, and a cylindrical lens which constitutes the transporting roller 101. Light guiding rod means 52 receive rays passing through light permeable portions of program tape 51, and guide the rays to photocells 103 which produce impulses supplied to a gate 44 of the same type as gate r in FIG. 12 which responds to two simultaneous impulses to assume a circuit closing position, and is frequently referred to as an AND-gate. The shape of the impulses is schematically indicated at 53, and it will be seen that the impulses are comparatively long, corresponding to the elongated shape of program elements a', see FIG. 9, and represent a particular pattern. An impulse generator 59 corresponds to the magnetic pick-up head 9, 10 described with reference to FIG. 3, but the rotary control disc 8 with projections 8' is replaced by the needle cylinder 56 and its projections 55. Consequently, a series of exactly timed impulses of the same short duration will be produced by impulse generator pick up head 59, an impulse being produced whenever a projection 55 passes the pick-up head 59. The impulses are supplied to a pulse shaper 57 which forms the impulses produced by impulse generator 59 to assume an exactly rectangular shape as schematically indicated as 58. It will be seen that impulses 53 and 58 correspond to the impulses shown in FIG. 11 at A' and B'. Impulses 58 are also supplied to the AND-gate 44 which preferably includes an amplifier. The super-imposed impulses have the narrow rectangular shape schematically indicated at 110, and are spaced in accordance with the program provided by program tape 1. In a transistorized power amplifier 111, impulses 110 are further amplified as schematically indicated at 112, and supplied to the electromagnetic actuating means of the operating means 54. For each operating means 54, a corresponding track of program elements a' is provided on program tape 51 and corresponding impulses 53 are superimposed by impulses 58. A photodiode 103 is associated with each track of the program tape 51. The impulses 53 of each photodiode 103 are supplied to the amplifier and AND-gate 41. Only one series of impulses 58 is produced by projections 55 of needle cylinder 6 and superimposed in gate 44 on the impulse produced by the respective photodiodes and tracks. Those impulses 58, which are not superimposed by a control impulse 53 are eliminated in the amplifier and AND-gate 44. Consequently, impulses 110 and 112 are arranged in a sequence and pattern determined by the program controlled impulses 3.

The importance of the synchronization of impulses 112 with the movements of the knitting cylinder, as compared with the non-synchronized impulses 53 will be understood from the following example.

Assuming that needle cylinder 56 rotates at 18 revolutions per minute, has a diameter of 30 inches, and 1680 cylinder needles, a time period of 1.8 milliseconds is available for the selection and actuation of a cylinder needle. Considering the necessary peripheral distances between the cylinder needles due to mechanical design considerations, the impulse transmission from the program control means, and the actuation of the needle must be carried out within a time period of less than 1 millisecond, and actually 0.5 millisecond are required for the operation of a needle.

The comparatively long program controlled impulses 53 cannot cause control operations of operating means 54 at such a speed and within such a short time. Even if it were possible to produce such short impulses by a program tape, any relative displacement between transporting roller 101 and needle cylinder 56, or between program tape 51 and transporting roller 101 would cause a delay or advance of the impulse acting on the needle which would cause the next following needle or the preceding needle to be operated instead of the needle selected by the program tape.

By using only exactly the spaced short portions of the program controlled impulses, which is obtained by selecting exactly timed portions 110 of the program controlled impulses 53 by means of the exactly synchronized and spaced impulses 58, the operation of the needles of the needle cylinder, or the selection of jacks in a pattern wheel can be obtained within the extremely short necessary time periods available for selection and operation of the respective needle on the continuously rotating means 56.

It will be understood that each of the elements described above, or two or more together, may also find a useful application in other types of arrangements for synchronizing program controlled operations with machine movements differing from the types described above.

While the invention has been illustrated and described as embodied in a knitting machine in which needle selecting operating means are controlled by program controlled impulses and synchronizing impulses produced by a rotary machine element, such as a needle cylinder, a pattern wheel, or a control means rotating in rigid synchronism with the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a knitting machine, in combination, an arrangement for synchronizing program needle selecting operations with machine movements, comprising first continuously movable means; control means moving in rigid synchronism with said first movable means; first switching means having inoperative and operative conditions and controlled by said control means to cyclically assure said operative condition for predetermined first time periods at exactly spaced time intervals; second continuously movable means; means connecting said first and second movable means for movement; program control means for determining the selection of needles in accordance with a desired knitting pattern and being continuously driven by said second movable means in such a manner that exact synchronism of said program control means with said first movable means can not be maintained; second switching means having inoperative and operative conditions, and being controlled by said program control means in accordance with a program to assume said operative condition for second time periods longer than said first time periods and timed so that during relative movement between said first and second movable means and said program control means, said first time periods fall within said second time periods; and at least one operating means for controlling needle selecting operations, and having electric actuating means connected into the circuit of said first and second switching means and being energized to actuate said operating means only when both said first and second switching means are in said operative conditions whereby said needle selecting operations are controlled by said operating means in accordance with a program determined by said program control means and in exact synchronism with said first movable means irrespective of relative movement between said first and second movable means and said program control means.

2. An arrangement according to claim 1 wherein said second movable means include transporting roller means; and wherein said program control means include a tape transported by said roller means and having elongated program elements controlling said second switching means to assume said operative condition for second time periods whose length is determined by the speed of said transporting roller means and by the length of said elongated program elements.

3. An arrangement according to claim 2 wherein said first movable means include a rotary machine member supporting said operating means and said electric actuating means so that said operating means moves relative to said rotary machine member.

4. An arrangement according to claim 3 wherein said rotary machine member is a pattern wheel having needle influencing jacks movable in radial directions between two positions; wherein said electric actuating means is an electromagnet; and wherein said operating means is controlled by the armature of said electromagnetic means to place said jacks selectively in one of said positions.

5. An arrangement according to claim 1 wherein said first movable means include a rotary machine member, wherein said control means are control elements uniformly spaced in circumferential directions of said machine member; wherein said first switching means include impulse generator means actuated by said control elements to produce uniformly timed impulses; and a gate receiving said impulses, and also impulses from said second switching means and connected to said actuating means for energizing the same.

6. An arrangement according to claim 1 wherein said first movable means is a rotary machine member; and wherein said control means are peripheral projections on said rotary machine member.

7. An arrangement according to claim 6 wherein said electric actuating means is an electromagnet and wherein said operating means is controlled by the armature of said electromagnet.

8. An arrangement according to claim 1 including a circuit connecting said first and second switching means and having a source of electric energy; and gate means receiving impulses from said first and second switching means in said operative conditions and being responsive to impulses from both said switching means to produce an impulse for energizing said electric actuating means.

9. An arrangement according to claim 8 wherein said first movable means include a rotary machine member; wherein said control means are peripheral projections on said machine member; and wherein said first switching means include electromagnetic impulse generator means excited by flux variations produced by said projections to create impulses supplied to said gate means.

10. An arrangement according to claim 9 wherein said peripheral projections are magnetized.

11. An arrangement according to claim 8 wherein said first movable means include a rotary machine member permanently electrically polarized; and wherein said first switching means include electrometer tube means energized by said polarized machine member for producing impulses supplied to said gate means.

12. An arrangement according to claim 8 wherein said first movable means include a rotary machine member having a plurality of permanent magnets; and wherein said first switching means include an armature member response to said magnets to place said first switching means in said operative position.

13. In a knitting machine, in combination, an arrangement for synchronizing program controlled needle selecting operations with machine movements, comprising a rotary machine member; control means moving in rigid synchronism with said rotary machine member; first switching means having inoperative and operative conditions and controlled by said control means to cyclically assume said operative condition for predetermined first time periods at exactly spaced time intervals; program control means; means connecting said rotary machine member with said program control means for driving the latter in such a manner that exact synchronism of said program control means with said rotary machine member cannot be maintained; second switching means having inoperative and operative conditions, and being controlled by said program control means in accordance with a program to assume said operative condition for second time periods longer than said first time periods and timed so that during relative movement between said rotary machine member and said program control means, said first time periods fall within said second time periods; and operating means supported on said rotary machine member including needle controlling means and electric actuating means for operating said needle controlling means, said electric actuating means being connected into the circuit of said first and second switching means and being energized to actuate said needle controlling means only when both said first and second switching means are in said operative conditions whereby said needle selecting operations are controlled by said operating means in accordance with a program determined by said program control means and in exact synchronism with said rotary machine member irrespective of relative movement between said rotary machine member and said program control means.

14. An arrangement as defined in claim 13 wherein said rotary machine member is a pattern wheel; wherein said needle controlling means include a plurality of needle influencing jacks mounted on said pattern wheel; and wherein said electric actuating means includes an electromagnet having a movable armature for selectively operating said jacks.

References Cited by the Examiner
UNITED STATES PATENTS

| | | | |
|---|---|---|---|
| 2,558,895 | 7/1951 | Yankeeldv | 66—154 X |
| 2,703,862 | 3/1955 | Gordon | 317—5 X |
| 2,731,817 | 1/1956 | Thurston | 66—43 |
| 2,829,229 | 4/1958 | Metz | 317—124 X |
| 2,941,097 | 6/1960 | Steele | 307—112 |
| 2,944,157 | 7/1960 | McAuslan et al. | 317—124 X |
| 3,025,496 | 3/1962 | Schmid et al. | 317—137 |
| 3,035,426 | 5/1962 | MacQueen | 66—154 X |

MERVIN STEIN, *Primary Examiner.*
W. C. REYNOLDS, *Examiner.*